(12) United States Patent
Genschorek

(10) Patent No.: US 8,777,176 B2
(45) Date of Patent: Jul. 15, 2014

(54) DEVICE FOR MOUNTING SOLAR MODULES

(75) Inventor: Gido Genschorek, Schwedt (DE)

(73) Assignee: HatiCon GmbH, Schwedt (DE)

( * ) Notice: Subject to any disclaimer, the term of this patent is extended or adjusted under 35 U.S.C. 154(b) by 782 days.

(21) Appl. No.: 12/597,005

(22) PCT Filed: Apr. 3, 2008

(86) PCT No.: PCT/DE2008/000590
§ 371 (c)(1),
(2), (4) Date: Oct. 22, 2009

(87) PCT Pub. No.: WO2008/128506
PCT Pub. Date: Oct. 30, 2008

(65) Prior Publication Data
US 2010/0127142 A1    May 27, 2010

(30) Foreign Application Priority Data

Apr. 23, 2007 (DE) .......................... 10 2007 020 234
Apr. 23, 2007 (DE) .................... 20 2007 006 153 U

(51) Int. Cl.
*A47F 5/00* (2006.01)

(52) U.S. Cl.
USPC .................. 248/351; 248/156; 248/288.31

(58) Field of Classification Search
USPC ............ 248/156, 292.12, 297.11, 351, 530, 248/533, 545, 288.31
See application file for complete search history.

(56) References Cited

U.S. PATENT DOCUMENTS

| | | | | |
|---|---|---|---|---|
| 1,999,925 A | * | 4/1935 | Buzhardt | 248/156 |
| 3,809,348 A | * | 5/1974 | Di Laura | 248/49 |
| 4,833,566 A | * | 5/1989 | Nickola | 361/664 |
| 5,125,608 A | | 6/1992 | McMaster et al. | |
| 2005/0051683 A1 | * | 3/2005 | Young | 248/187.1 |
| 2007/0102614 A1 | * | 5/2007 | McKinney | 248/351 |
| 2008/0210221 A1 | | 9/2008 | Genschorek | |

FOREIGN PATENT DOCUMENTS

| | | |
|---|---|---|
| BE | 898560 A1 | 6/1984 |
| DE | 7913751 U1 | 8/1982 |
| DE | 19615872 A1 | 10/1997 |
| DE | 19736223 A1 | 2/1998 |
| DE | 20300996 U1 | 3/2003 |
| DE | 20319065 U1 | 2/2004 |
| DE | 102004010515 A1 | 10/2004 |
| DE | 202005004236 U1 | 10/2005 |
| DE | 102005007184 B3 | 6/2006 |
| DE | 202006014047 U1 | 12/2006 |
| DE | 102005030039 A1 | 1/2007 |
| DE | 202007008377 U1 | 8/2007 |
| FR | 2651030 A1 * | 2/1991 |

(Continued)

*Primary Examiner* — Gwendolyn W Baxter
(74) *Attorney, Agent, or Firm* — Patent Central LLC; Stephan A. Pendorf

(57) ABSTRACT

A device for mounting solar modules/solar panels on props that are introduced into the ground of the mounting location, wherein supports that can be connected on top of or on the props are arranged by means of fastening means that allow vertical compensation and/or lateral compensation for deviations of the introduced props from the perpendicular, with a rail (3) that can be connected to the prop (2), a T-shaped or L-shaped or U-shaped connecting flange (4) with at least one connector (8) for a support (5), and a rocker bearing (6) that allows the connection between the rail (3) and the connecting flange (4) to be established.

13 Claims, 7 Drawing Sheets

(56) References Cited

FOREIGN PATENT DOCUMENTS

| | | | |
|---|---|---|---|
| JP | 61040063 A | 2/1986 |
| JP | 2001090455 A | 4/2001 |
| JP | 2003184235 A | 7/2003 |
| WO | 9012990 A1 | 11/1990 |
| WO | 0031477 A1 | 6/2000 |

* cited by examiner

DEVICE FOR MOUNTING SOLAR MODULES

BACKGROUND OF THE INVENTION

1. Field of the Invention

The invention relates to a device for mounting solar modules/solar panels using props driven into the ground, preferably crash-barrier props having a Σ-cross-section. The device is particularly suitable for mounting solar modules in such a way that the solar modules are arranged in rows and next to each other and are inclined to the south.

2. Description of the Related Art

Supporting structures for solar modules/solar panels using props are known.

A first group uses a number of props that are connected to each other on their heads by means of a support on which the solar modules are then arranged directly next to each other (DE 203 03 257 U1) or using transverse supports running from north to south (DE 203 19 065 U1).

In the direct arrangement, one uses, on account of (among other things) the wider rest, inclined crash-barrier profiles, or the support is formed of two supports that are connected to each other in parallel and by means of webs, wherein the attachment on the heads is established in the region of the webs (DE 20 2006 011 393 U1).

The supports or webs are attached to the props by means of bows or angles that allow vertical and lateral adjustment so that positional inaccuracies of the driven-in props can be compensated for and the support can be mounted in a horizontal position. The angle of inclination for optimal insolation is also predetermined by the shape of the bows or angles.

One special disadvantage of this group of supporting structures is its instability under external loading (wind, snow) on account of the fact that there is only one row of props. Further, the prefabricated bows or angles provide only limited flexibility with respect to location-specific adjustment.

A second group of supporting structures uses double rows of props that provide a mounting base for the solar modules/solar panels by means of north-south supports and/or transverse supports (DE 10 2005 015 346 A1, U.S. Pat. No. 4,966,631).

Here as well, the supports are attached to the props by means of angles. In so far as the issue of possible compensation during mounting is addressed at all, it concerns oblong holes in the screwed connections in this case, too.

SUMMARY OF THE INVENTION

The object of the invention is to suggest a form of the supporting structure for solar modules that provides a high degree of possible compensation for deviations caused by the driving-in of the props, wherein the technical means used therefor are to be usable universally, i.e. not specifically for a particular location.

This object is achieved by the features described below and claimed in the independent claims; advantageous embodiments are subject matter of the dependent claims.

The inventive device for mounting solar modules/solar panels on props that are introduced into the ground of the mounting location, wherein supports that can be connected on top of or on the props are arranged by means of fastening means that allow vertical compensation and/or lateral compensation for deviations of the introduced props from the perpendicular, provides the following fastening means:

- a rail that can be connected to the prop,
- a T-shaped or L-shaped or U-shaped connecting flange with at least one connector for a support for solar modules, and
- a rocker bearing that allows the connection between the rail and the connecting flange to be established.

The advantageous arrangement of a rocker bearing provides, in a simple and cost-effective way, an almost universal possibility of compensating for deviations from the perpendicular arrangement of the respective prop.

In one advantageous embodiment, the rail has, in the upper end portion that is remote from the prop, a seat for the socket of the rocker bearing formed as a ball-and-socket joint, and the ball of the rocker bearing inserted in the socket can be connected to the connecting flange.

Of course, the arrangement can also be designed the other way round in that a leg or a web of the connecting flange has a seat for the socket of the rocker bearing, and the ball of the rocker bearing inserted in the socket can be connected to the rail.

A further advantageous embodiment provides that the T-shaped connecting flange is designed as a forked flange with two webs whose clearance is dimensioned such that each of the webs reaches, on the face, over the ball of the rocker bearing and can be connected to the ball, preferably by means of a screw-bolt-joint.

It is understood that the legs or webs of the connecting flange resting on the ball of the rocker bearing must still be spaced from the rail so that the possibility of adjusting provided by the rocker bearing can be made use of. In other words, the width of the ball of the rocker bearing must be greater than the thickness of the rail in this region.

Preferably, rocker bearings with a spherically curved sliding pair between the ball and the socket are used. Since the sliding pair is basically used only once (during mounting), it is possible to use a rocker bearing that requires absolutely little maintenance and is not designed for permanent dynamic load.

A further possibility of compensating is provided by the fact that the rail can be vertically adjustably connected to the prop, wherein one advantageous realisation provides that the rail is designed, at least in the region where it is attached to the prop, as a hollow profile and/or a profile with external longitudinal webs or external longitudinal slots so that it is slidable over and/or into the prop or parts of the prop.

A further embodiment that is illustrated in the drawings provides that the rail is divided into a first sectional rail for establishing the connection to the prop, and a second sectional rail for establishing the connection to the connecting flange, wherein the two sectional rails can be connected to each other.

Preferably, the props are arranged in double rows, wherein the supports arranged on the connecting flanges each run from north to south, i.e. connect two props to each other, and these supports are connected to each other by continuous transverse supports on which the solar modules are arranged.

BRIEF DESCRIPTION OF THE DRAWINGS

The invention will be explained on the basis of exemplary embodiments. The drawings show.

DETAILED DESCRIPTION OF THE INVENTION

Figure 1:
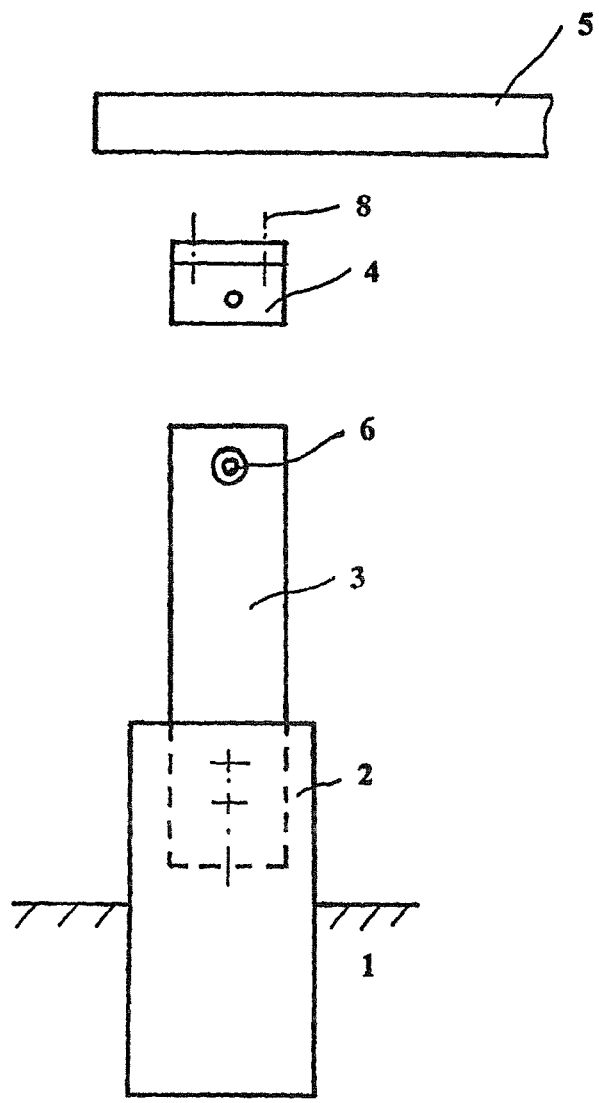
FIG. 1: the individual component parts of the device.

FIG. 1 outlines the essential component parts of the device for mounting solar modules/solar panels.

A prop 2, preferably a crash-barrier prop having a i-cross-section, is driven into the ground 1 of the mounting location. The prop 2 is connected to the support 5 by means of fastening means that comprise:
- a rail 3 that can be connected to the prop 2,
- a T-shaped or L-shaped or U-shaped connecting flange 4 with at least one connection means 8 comprising, e.g., one or several bore/s in the free web of the L-profile or in the head beam 4.1 of the T-profile of the connecting flange 4 and bolts that can be inserted therein for connecting the flange 4 to the support 5, and
- a rocker bearing 6 that allows the connection between the rail 3 and the connecting flange 4 to be established.

The rocker bearing 6 is a ball-and-socket joint with a ball 6.1 arranged, in the upper end portion of the rail 3 that is remote from the prop 2, in a socket 6.2 of the ball-and-socket joint which is seated in a seat 9. The ball 6.1 of the rocker bearing 6 inserted in the socket 6.2 can be connected to the connecting flange 4.

Figure 2:
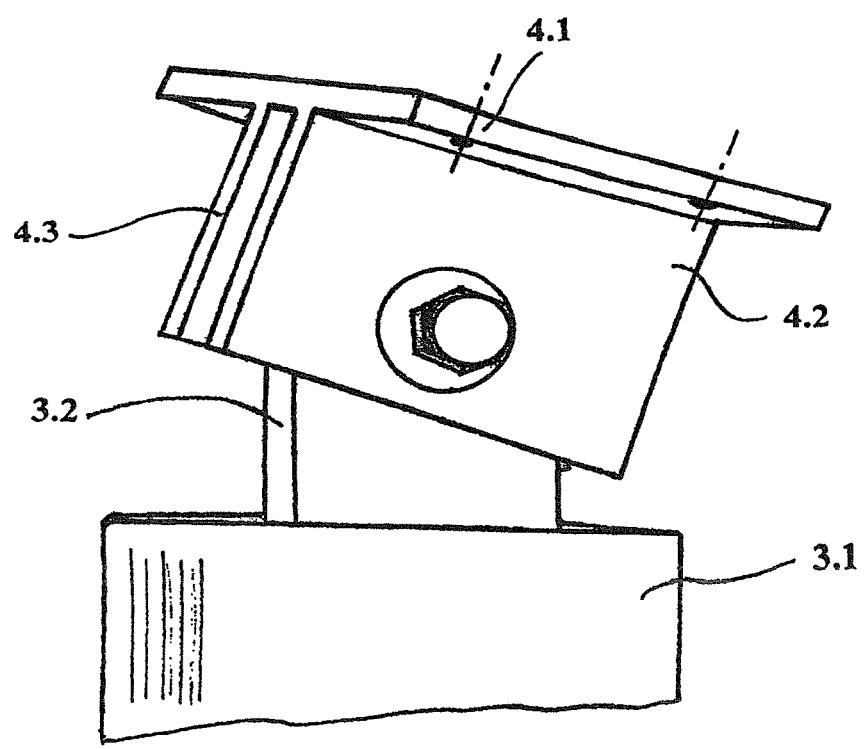
FIG. 2: the divided rail.
Figure 3:
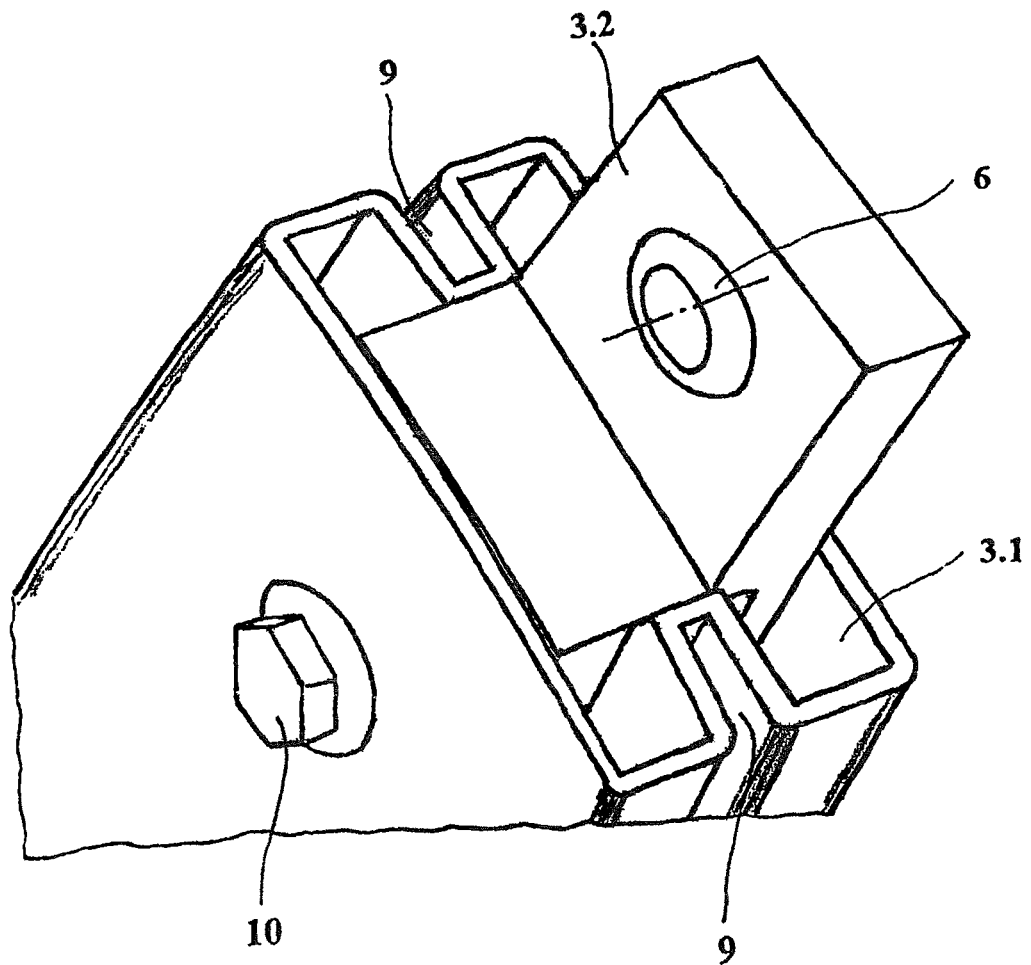
FIG. 3: the connecting-flange arrangement.
Figure 4:
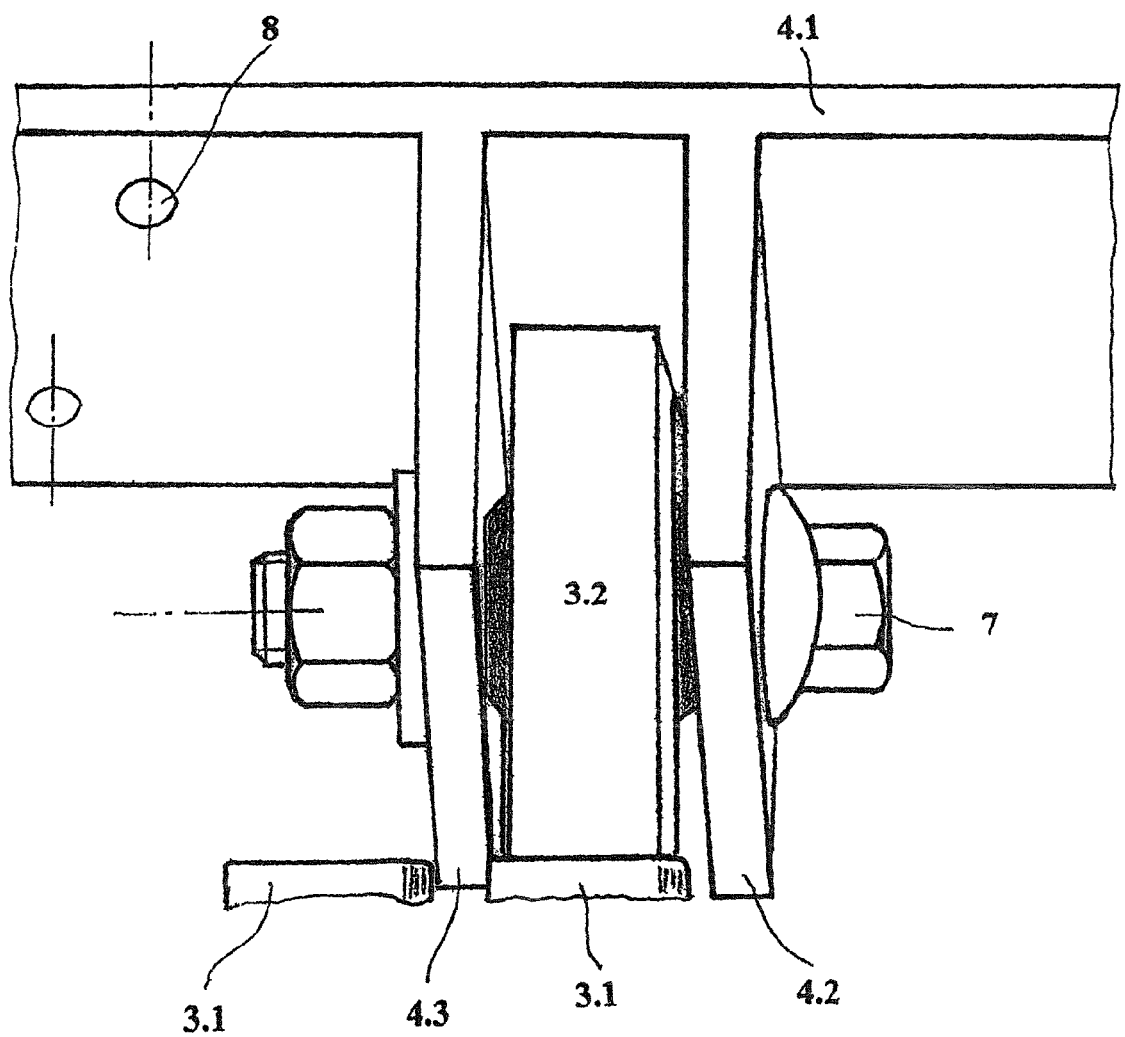
FIG. 4: the connecting-flange fixture.
Figure 5:
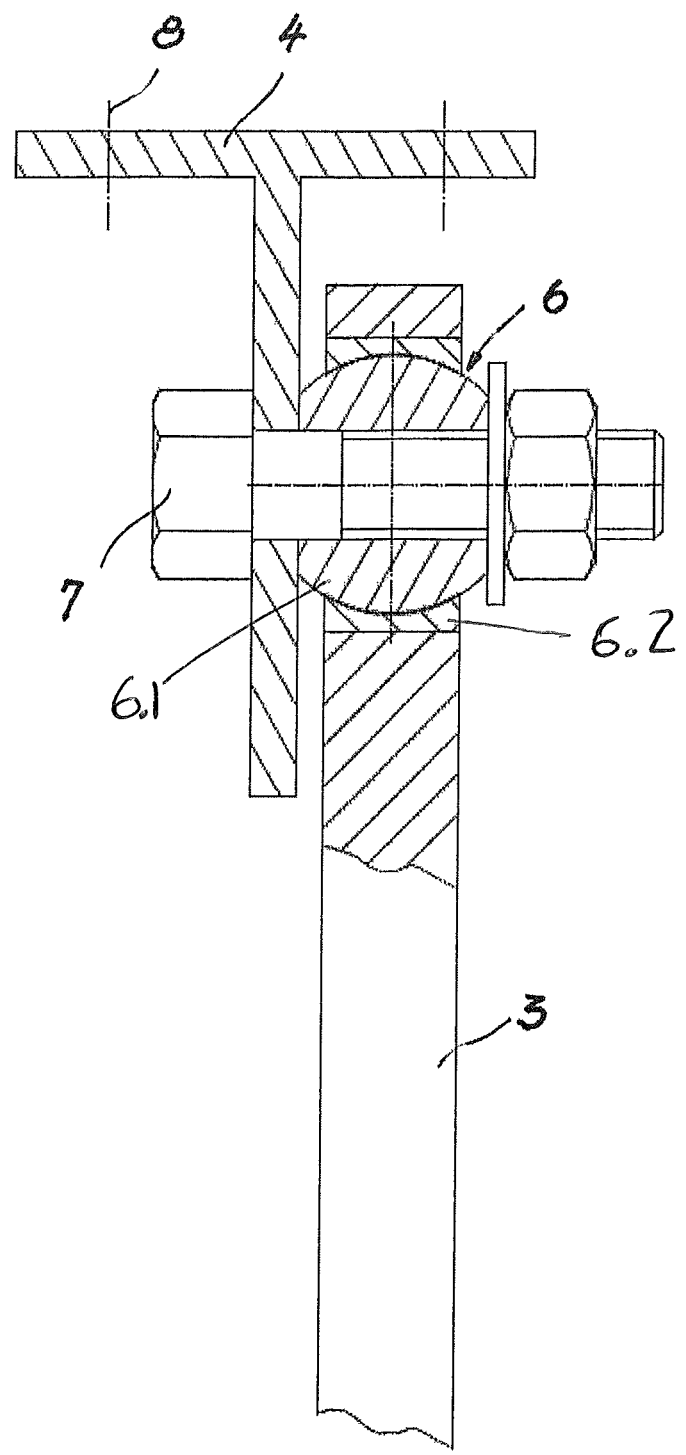
FIG. 5 a T-shaped connecting flange.
Figure 6:
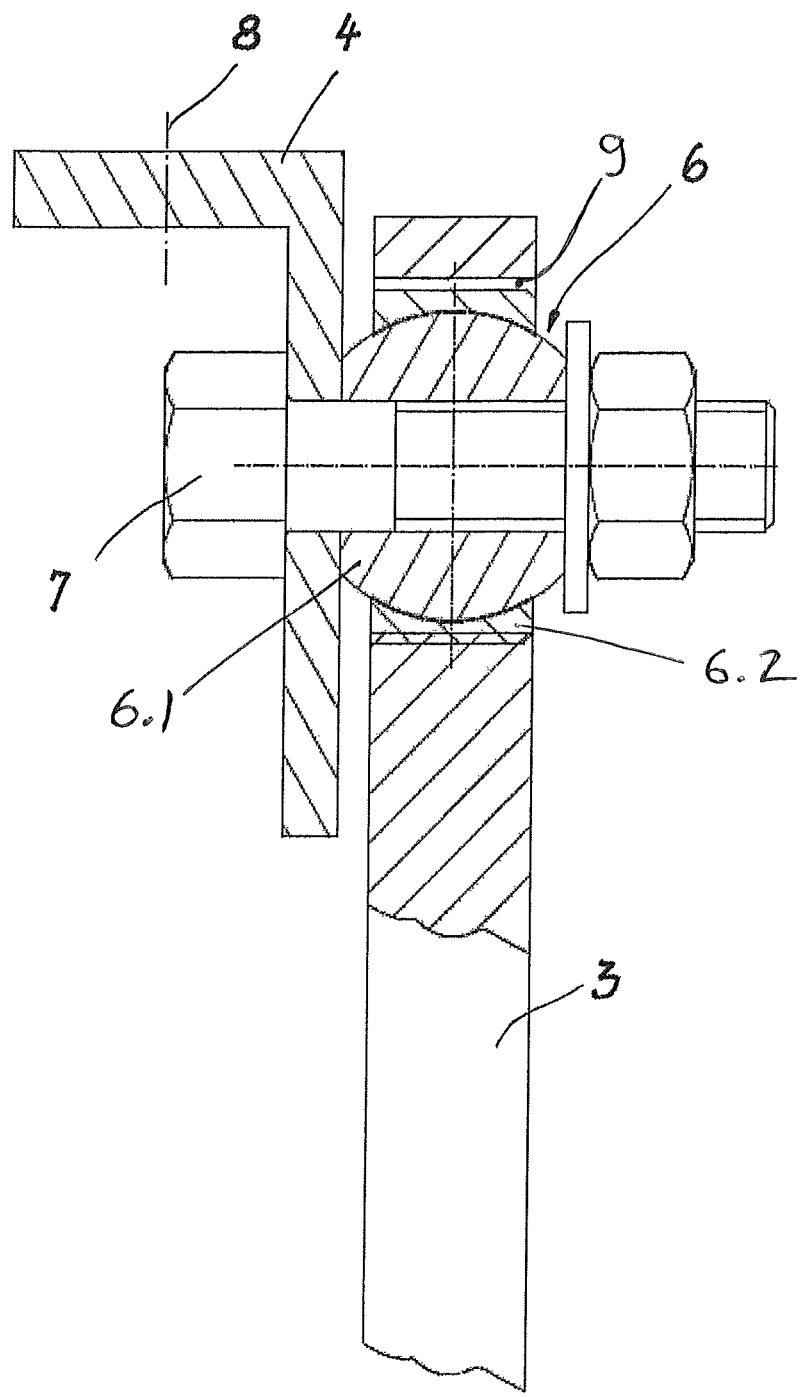
FIG. 6 an L-shaped connecting flange.
Figure 7:
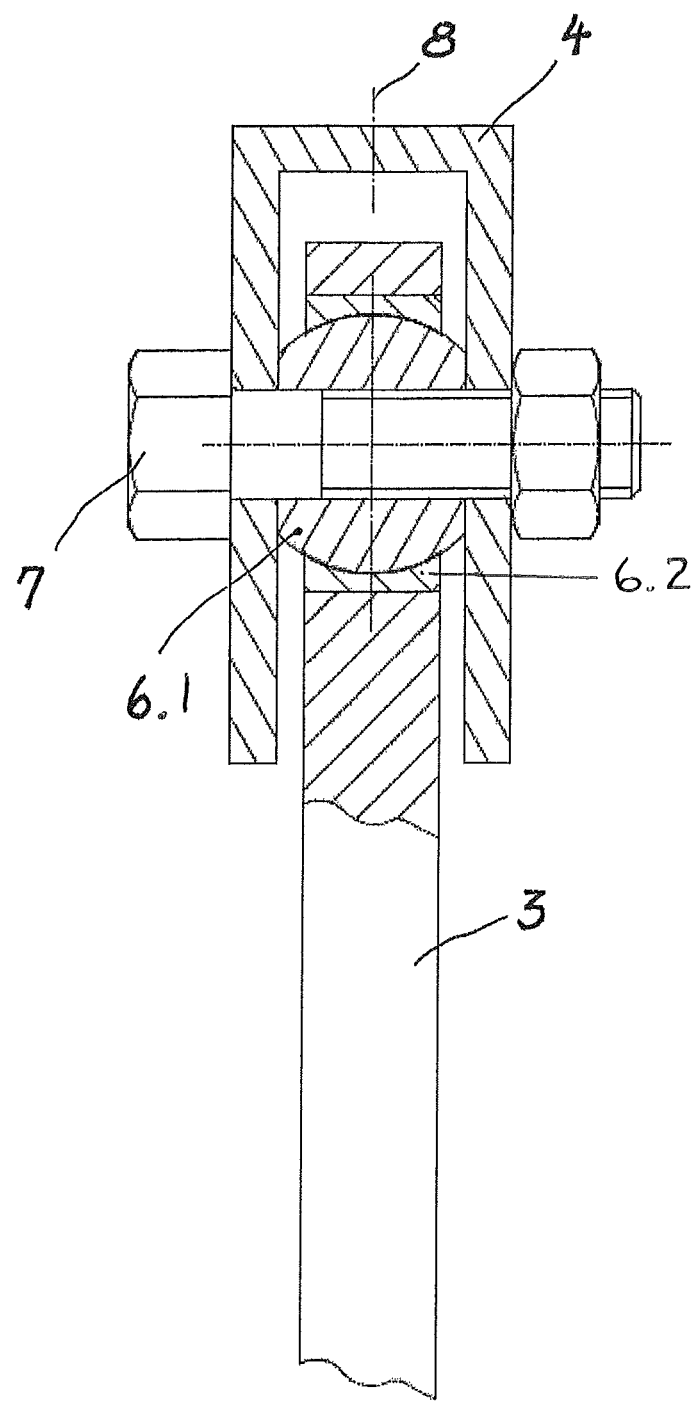
FIG. 7 a U-shaped connecting flange.

FIG. 2 to FIG. 4 illustrate the details of a preferred embodiment of the device. Here, the rail 3 with the connecting flange 4 for establishing the connection to the support 5 is designed as a divided rail with a connecting rail 3.1 for the prop 2 and a sectional rail 3.2 for establishing the connection to the connecting flange 4. The sectional rail 3.1 for establishing the connection to the prop 2 is designed as a hollow profile and/or a profile with external longitudinal webs or external longitudinal slots 9 so that it is slidable over and/or into the prop 2 or parts of the prop 2.

As shown in FIG. 3, the connecting sectional rail 3.1 is designed as a hollow profile with lateral slots 9 that are dimensioned such that, when the connecting sectional rail 3.1 is put on the Σ-shaped prop 2, the inward cranked i-legs of the prop 2 engage this slot 9 so that a lateral form closure between the connecting sectional rail 3.1 and the prop 2 is established. The sectional rail 3.1 for establishing the connection to the prop 2 is vertically adjustably screwed on the prop 2.

The sectional rail 3.2 is put in a hollow profile of the connecting rail 3.1 and screwed thereon. This can take place in a rigid position that is fixed by the bores and stops. However, it is also possible to make use of the degrees of freedom: pivoting about the connecting bolt 10 and/or vertical adjustment by using an oblong hole.

The sectional rail 3.2 contains the rocker bearing 6 whose ball 6.1 projects beyond the sectional rail 3.2 on the outside and can be connected to the connecting flange 4.

It can be clearly seen in FIG. 4 that the T-shaped connecting flange 4 is designed as a forked flange with two webs 4.2, 4.3 whose clearance is dimensioned such that each of the webs 4.2, 4.3 reaches, on the face, over the ball of the rocker bearing 6 and can be connected to the ball 6.1, preferably by means of a screw-bolt-joint 7.

Thus, the connecting flange 4 can be inclined in all angles with respect to a horizontal plane, thereby compensating for deviations from the perpendicular arrangement of the props 2. Level differences can be compensated for by longitudinal displacement of the connecting sectional rail 3.1 with respect to the prop 2.

The supports 5 are attached by means of the connection means 8 that are bores in the beam 4.1 of the T-shaped connecting flange 4 and bolts inserted in the bores.

Since the function of the rocker bearing/s 6 of the individual props 2 continues to exist after establishing the screwed connection to the connecting flanges 4, the connecting flanges 4 are automatically aligned with the flange facing of the support 5 when the bolts of the connection means 8 are tightened. When several props 2, supports 5 and transverse supports are used, the whole stand aligns in itself and ensures a continuous and even rest for the solar modules that are to be arranged in rows and next to each other.

LIST OF REFERENCE NUMERALS

1 ground
2 prop
3 rail
3.1 sectional rail for establishing the connection to the prop
3.2 sectional rail for establishing the connection to the connecting flange
4 connecting flange
4.1 head beam
4.2 web
4.3 web
5 support
6 rocker bearing
7 screwed connection
8 connection means
9 slot
10 connecting bolt

The invention claimed is:

1. A device for mounting solar modules or solar panels, the device comprising:
   - props that are introduced generally vertically into the ground,
   - supports for the solar modules or solar panels, which supports are disposed on said props and can be connected thereto, and
   - fastening means for achieving the connection between the props and the supports, wherein the fastening means allow for at least one of vertical compensation and lateral compensation for deviations of the introduced props from vertical relative to the ground, and wherein each fastening means comprises:
     - a rail (3) that can be connected to a prop (2), with one rail provided for each prop,
     - a T-shaped or L-shaped or U-shaped connecting flange (4) with at least one connection means (8) for connecting the flange (4) to one of said supports (5), and
     - a rocker bearing (6) that allows a connection between the rail (3) and the connecting flange (4) to be established, wherein the rocker bearing (6) is a ball-and-socket joint, and wherein the T-shaped connecting flange (4) is designed as a forked flange with two webs (4.2, 4.3) whose clearance is dimensioned such that each of the webs (4.2, 4.3) reaches, on the face, over the ball of the rocker bearing (6) and can be connected to the ball.

2. The device according to claim 1, wherein the rail (3) is divided into a first sectional rail (3.1) for establishing the connection to the prop (2), and a second sectional rail (3.2) for establishing the connection to the connecting flange (4), and wherein the two sectional rails can be connected to each other.

3. The device according to claim 2, wherein the connection between the sectional rail (3.1) for establishing the connection to the prop (2) and the sectional rail (3.2) for establishing the connection to the connecting flange (4) is provided with at least one degree of freedom during establishing the connection.

4. The device according to claim 2, wherein the rail (3) or the sectional rail (3.1) is vertically adjustably connected to the prop (2).

5. The device according to claim 2, wherein the rail (3) or the sectional rail (3.1) for establishing the connection to the prop (2) is designed as at least one of a hollow profile and a profile with external longitudinal webs or external longitudinal slots (9) so that it is slidable over or into the prop (2) or parts of the prop (2).

6. The device according claim 2, wherein the sectional rail (3.1) is designed with a hollow profile, and wherein the sectional rail (3.2) for establishing the connection to the connecting flange (4) can be inserted into the hollow profile of the sectional rail (3.1) for establishing the connection to the prop (2).

7. The device according to claim 1, wherein the T-shaped connecting flange (4) comprises a head beam (4.1) and a web (4.2), and wherein the connection means (8) consists of one or several bores in the free web of the T-shaped connecting flange (4) or in the head beam (4.1) of the T-shaped connecting flange (4) with bolts that can be inserted therein.

8. The device according to claim 1, further comprising solar modules arranged on the device, wherein the props (2) are arranged in double rows, each support (5) runs from north to south, and the supports (5) are connected to each other by continuous transverse supports on which the solar modules are arranged.

9. The device according to claim 1, wherein the rocker bearing (6) is a ball-and-socket joint, and wherein the T-shaped connecting flange (4) is designed as a forked flange with two webs (4.2, 4.3) whose clearance is dimensioned such that each of the webs (4.2, 4.3) reaches, on the face, over the ball of the rocker bearing (6) and can be connected to the ball by means of a screw-bolt-joint.

10. A device for mounting solar modules or solar panels, the device comprising:
  props that are introduced generally vertically into the ground,
  supports for the solar modules or solar panels, which supports are disposed on said props and can be connected thereto, and
  fastening means for achieving the connection between the props and the supports, wherein the fastening means allow for at least one of vertical compensation and lateral compensation for deviations of the introduced props from vertical relative to the ground, and wherein each fastening means comprises:
  a rail (3) that can be connected to a prop (2), with one rail provided for each prop,
  a T-shaped or L-shaped or U-shaped connecting flange (4) with at least one connection means (8) for connecting the flange (4) to one of said supports (5), and
  a rocker bearing (6) that allows a connection between the rail (3) and the connecting flange (4) to be established, wherein the rocker bearing (6) is a ball-and-socket joint, and wherein the rail (3) has, in the upper end portion that is remote from the prop (2), a socket for the ball of the rocker bearing (6), and wherein the ball of the rocker bearing (6) inserted in the socket is connected to the connecting flange (4).

11. A device for mounting solar modules or solar panels, the device comprising:
  props that are introduced generally vertically into the ground,
  supports for the solar modules or solar panels, which supports are disposed on said props and can be connected thereto, and
  fastening means for achieving the connection between the props and the supports, wherein the fastening means allow for at least one of vertical compensation and lateral compensation for deviations of the introduced props from vertical relative to the ground, and wherein each fastening means comprises:
  a rail (3) that can be connected to a prop (2), with one rail provided for each prop,
  a T-shaped or L-shaped or U-shaped connecting flange (4) with at least one connection means (8) for connecting the flange (4) to one of said supports (5), and
  a rocker bearing (6) that allows a connection between the rail (3) and the connecting flange (4) to be established, wherein the rocker bearing (6) is a ball-and-socket joint, and wherein a leg or a web of the connecting flange (4) has a socket for the ball of the rocker bearing (6), and the ball of the rocker bearing (6) inserted in the socket is connected to the rail (3).

12. A device for mounting solar modules or solar panels, the device comprising:
  props that are introduced generally vertically into the ground,
  supports for the solar modules or solar panels, which supports are disposed on said props and can be connected thereto, and
  fastening means for achieving the connection between the props and the supports, wherein the fastening means allow for at least one of vertical compensation and lateral compensation for deviations of the introduced props from vertical relative to the ground, and wherein each fastening means comprises:
  a rail (3) that can be connected to a prop (2), with one rail provided for each prop,
  a T-shaped or L-shaped or U-shaped connecting flange (4) with at least one connection means (8) for connecting the flange (4) to one of said supports (5), and
  a rocker bearing (6) that allows a connection between the rail (3) and the connecting flange (4) to be established, wherein the rocker bearing (6) is a ball-and-socket joint, and wherein the rocker bearing (6) has spherically curved sliding surfaces between the ball and the socket.

13. A device for mounting solar modules or solar panels, comprising props that are introduced generally vertically into the ground and supports for the solar modules or solar panels, which supports are disposed on said props and can be connected thereto, wherein the props are arranged in one row or in two rows, wherein the connection between the props and the supports is achieved by means of fastening means that allow for at least one of vertical compensation and lateral compensation for deviations of the introduced props from vertical relative to the ground, and wherein the fastening means comprise:
  a rail (3) that can be connected to a prop (2), with one rail provided for each prop,
  a T-shaped or L-shaped or U-shaped connecting flange (4) with at least one connection means (8) for connecting the flange (4) to one of said supports (5), and
  a rocker bearing (6) that allows a connection between the rail (3) and the connecting flange (4) to be established, wherein the rocker bearing (6) is a ball-and-socket joint, and wherein the rocker bearing (6) has spherically curved sliding surfaces between the ball and the socket.

\* \* \* \* \*